US008589199B2

(12) United States Patent
Iyengar et al.

(10) Patent No.: US 8,589,199 B2
(45) Date of Patent: Nov. 19, 2013

(54) METHOD AND SYSTEM FOR DETERMINING TESTING MATURITY OF AN ORGANIZATION

(75) Inventors: Venkatesh Iyengar, Jayanagar (IN);
Kavian Mohammad Goharderakhshan, Naperville, IL (US);
Satyajit Mohanty, Baramunda (IN);
Reghunath Balaraman, Bangalore (IN);
Aromal Venal Mohan, Ernakulam (IN)

(73) Assignee: Infosys Limited (IN)

( * ) Notice: Subject to any disclaimer, the term of this patent is extended or adjusted under 35 U.S.C. 154(b) by 279 days.

(21) Appl. No.: 13/072,226

(22) Filed: Mar. 25, 2011

(65) Prior Publication Data

US 2012/0101872 A1    Apr. 26, 2012

(30) Foreign Application Priority Data

Oct. 22, 2010   (IN) .......................... 3132/CHE/2010

(51) Int. Cl.
*G06Q 10/00*    (2012.01)
(52) U.S. Cl.
USPC ....................................... 705/7.11

(58) Field of Classification Search
USPC ....................................... 705/7.11
See application file for complete search history.

(56) References Cited

U.S. PATENT DOCUMENTS

| 8,126,768 | B2 * | 2/2012 | Mehrotra et al. | 705/7.36 |
| 8,407,078 | B1 * | 3/2013 | Caputo et al. | 705/7.27 |
| 2006/0069540 | A1 * | 3/2006 | Krutz | 703/22 |
| 2006/0206287 | A1 * | 9/2006 | Rosam et al. | 702/182 |

OTHER PUBLICATIONS

Judith (Achieving Capability Maturity Model Integration (CMMI) maturity level 4), Developer Works, Feb. 2007, pp. 1-5.*

* cited by examiner

*Primary Examiner* — Romain Jeanty
(74) *Attorney, Agent, or Firm* — Lerner, David, Littenberg, Krumholz & Mentlik, LLP

(57) ABSTRACT

The invention describes a method, a system, and a computer program product for determining the maturity of a testing organization. The testing organization may be defined as an organization that specializes or involves in testing of software/software applications. The method utilizes a pre-determined model to asses the maturity level of the testing organization. In addition to providing the pre-determined model, the invention facilitates in determining the maturity level across various test dimensions of the testing organization.

27 Claims, 9 Drawing Sheets

| S. No. | Test Dimension | Key Area | Ref # | Questions | Maturity Level | Category | Input |
|---|---|---|---|---|---|---|---|
| 1 | Test Engineering | Test Requirements Gathering | TRG 2.1 | Are the requirements communicated to the testing team | L2 | Project | Yes |
| 2 | Test Engineering | Test Requirements Gathering | TRG 2.2 | Are the requirement changes communicated to the testing team | L2 | Project | Yes |
| 3 | Test Engineering | Test Strategizing | TS 4.1 | Is there a master test strategy for common types of testing that is maintained on a periodic basis | L4 | Org | No |

FIG. 3A

| S. No. | Key Area | L1 | L2 | L3 | L4 | L5 |
|---|---|---|---|---|---|---|
| 1 | Test Requirements Gathering | | 100% | 63% | 100% | |
| 2 | Test Strategizing | | | 50% | 0% | 0% |
| 3 | Test Case and Test Data Design | | 100% | 71% | 38% | 0% |
| 4 | Test Tools | | 100% | 0% | 0% | 0% |
| 5 | Test Execution and Reporting | | 100% | 100% | 25% | 0% |
| 6 | Test Environment | | 100% | 100% | 0% | 0% |
| 7 | Test Estimation | | 100% | 50% | 40% | |
| 8 | Test Planning and Monitoring | | 100% | 50% | 50% | |
| 9 | Defect Management | | 100% | 50% | 50% | 67% |
| 10 | Test-ware Management | | 100% | 100% | 50 | |
| 11 | Organizational Risk Management | | | 100% | 0 | |
| 12 | Test Communication | | | 100% | 50% | |
| 13 | Test Methodology | | | 100% | 100% | 0% |
| 14 | Test Process Management | | | 100% | 0% | 0% |
| 15 | Test Policy | | | 100% | | |

FIG. 3B

| Test Dimension 1 | | | | |
|---|---|---|---|---|
| | Key Area | Question | Maturity Level | Received Input |
| | Key Area 1 | Question 1 | L2 | Yes |
| | | Question 2 | L2 | No |
| | | Question 3 | L3 | Yes |
| | Key Area 2 | Question 1 | L2 | No |
| | | Question 2 | L2 | Yes |
| | | Question 3 | L2 | Yes |
| | | Question 4 | L3 | No |
| | | Question 5 | L3 | No |

FIG. 3C

| Test Dimension | Test Dimension Maturity | L2 | L3 | L4 | L5 |
|---|---|---|---|---|---|
| Test Engineering | L2 | 100% | 68% | 24% | 0% |
| Test Management | L3 | 100% | 90% | 35% | 67% |
| Test Governance | L3 | 100% | 91% | 50% | 0% |
| Test Competency | L2 | 100% | 56% | 53% | 0% |

FIG. 3D

| Test Dimensions | Group 104a | Group 104b | Group 104c | Group 104d | Overall Maturity Level |
|---|---|---|---|---|---|
| Test Engineering | L3 | L3 | L4 | L2 | L2 |
| Test Management | L3 | L4 | L4 | L3 | L3 |
| Test Governance | L2 | L2 | L3 | L2 | L2 |
| Test Competency | L2 | L3 | L3 | L2 | L2 |

FIG. 3E

METHOD AND SYSTEM FOR DETERMINING TESTING MATURITY OF AN ORGANIZATION

FIELD OF INVENTION

The present invention relates to determining maturity of an organization that deals in testing of software/software applications.

BACKGROUND OF THE INVENTION

Presently, most of the businesses are supported by software applications. Software applications have become an indispensible means to handle one or more processes of any organization. For instance, a bank has software applications for almost all kind of processes, such as net banking, loans, and bank check issuance.

Such software applications are developed by engineers who understand the processes of the required business and implement the solutions in the form of codes. Further, similar to a typical product manufactured in an automobile factory, these end products, i.e., software applications, also have to be tested for inconsistencies and errors. Typically, various Information Technology-Enabled Service (ITES) companies perform a thorough testing of the software applications prior to finalizing them for delivery.

Currently, companies have realized the need for an independent testing team. They have started formulating various processes and guidelines to ensure a thorough testing of software applications. All companies formulate their own set of processes and guidelines to ensure the quality of testing. It becomes important for a software-developing organization to ensure that its testing practice is robust and helps such companies to achieve their business objectives. Immature or inconsistent testing practices may impact the quality of software application negatively and can affect their business revenue. Thus, it becomes important for the companies to evaluate and benchmark these practices with those of the industry to bring in continuous improvement.

There are a few solutions/models available in the market that help a particular organization evaluate its maturity level with respect to software testing. These models facilitate the organization in understanding various other steps that need to be followed to enhance its testing capabilities or testing rating. However, these models guide the organization only from a generic perspective, i.e., holistically, and provide a bird-eye view about the adopted current testing level. Thus, most of the times such organizations fail to understand ground-level measures that are needed to improve testing procedures. Most of these models do not help the testing organizations evaluate their current behaviors, also referred to as behavior patterns of the testers/testing organization, to analyze the key weakness and to improve in those areas.

In light of the foregoing discussion, there is a need for a method and system to determine the testing organization's maturity in a robust manner. The method should enable the testing organization to understand measures that should be implemented at the ground level than at the holistic one. Further, the method and system should provide a robust mechanism of objectively calculating the testing organization's maturity level based on the behaviors exhibited by the organization. The method should help the organizations to focus on their key dimensions and strengthen the maturity of these dimensions.

BRIEF SUMMARY OF THE INVENTION

The invention provides a method, a system, and a computer program product for determining maturity of an organization that specifically deals with the testing of software. The method includes receiving an input corresponding to at least one question of a questionnaire. Further, the questionnaire is designed based on a pre-determined model. The pre-determined model includes one or more test dimensions. Each of the test dimensions includes one or more key areas. Further, each key area includes one or more behaviors that are again associated with one or more practices. In various embodiments of the invention, the practices are assigned a pre-defined level, wherein each question of the questionnaire is associated with a corresponding practice.

The method, the system, and the computer program product described above have a number of advantages. Firstly, the determination of the maturity level of the testing organization is based on the robust pre-determined model. The pre-determined model facilitates assessing the maturity level of the testing organization across various test dimensions. Further, in addition to determining the maturity level across the test dimensions, the pre-determined model facilitates the assessment of various key areas associated with the test dimensions. Such an assessment of the testing organization across these four dimensions and the key areas will facilitate the testing organization to understand its current testing procedures and its improvement areas in a more detailed fashion. Further, it may also help the testing organization to focus its time and resources in one particular direction, such as "Test Management".

The pre-determined model is primarily based on the behaviors associated with each of the key areas that are further translated into multiple practices. Thus, these practices help the testing organization evaluate its current procedures and the procedures that the testing organization should employ to attain significant maturity levels. Further, since the list of practices associated with each key area is an exhaustive compilation, it helps in better assessment of the testing organization, thereby guiding the testing organization by providing granular level details. In addition to the above advantages, the assessment of the testing organization is performed based on a standard questionnaire, which is based on the pre-determined model. Further, the responses provided by the employees of the testing organizations are also validated to ensure data authenticity. Such an assessment at each level based on the testers' responses provides a robust and foolproof mechanism to determine the maturity level of the testing organization.

BRIEF DESCRIPTION OF THE DRAWINGS

The various embodiments of the invention will hereinafter be described in conjunction with the appended drawings provided to illustrate, but not limited to, the invention, wherein like designations denote like elements, and in which:

FIG. 3A is an exemplary questionnaire based on the pre-determined model, in accordance with the embodiment of the invention;

FIG. 3B is a table depicting percentage compliances of one or more key areas across various maturity levels, in accordance with the embodiment of the invention;

FIG. 3C is a table depicting an exemplary key dimension, associated key areas, questions, and the received inputs;

FIG. 3D is a table depicting percentage compliances of one or more test dimensions across various maturity levels, in accordance with the embodiment of the invention;

FIG. 3E is a table depicting the maturity level of one or more groups of the testing organization across the test dimensions, in accordance with the embodiment of the invention;

DETAILED DESCRIPTION OF THE DRAWINGS

The invention describes a method, a system, and a computer program product for determining the maturity of a testing organization. The testing organization may be defined as an organization that specializes or involves in testing of software/software applications. The method utilizes a pre-determined model to assess the maturity level of the testing organization. In addition to providing the pre-determined model, the invention facilitates in determining the maturity level across various test dimensions of the testing organization. The detailed methodology for determining the maturity level of the testing organization and the design of the pre-determined model respectively have been explained in detail in conjunction with the figures described below.

Figure 1:
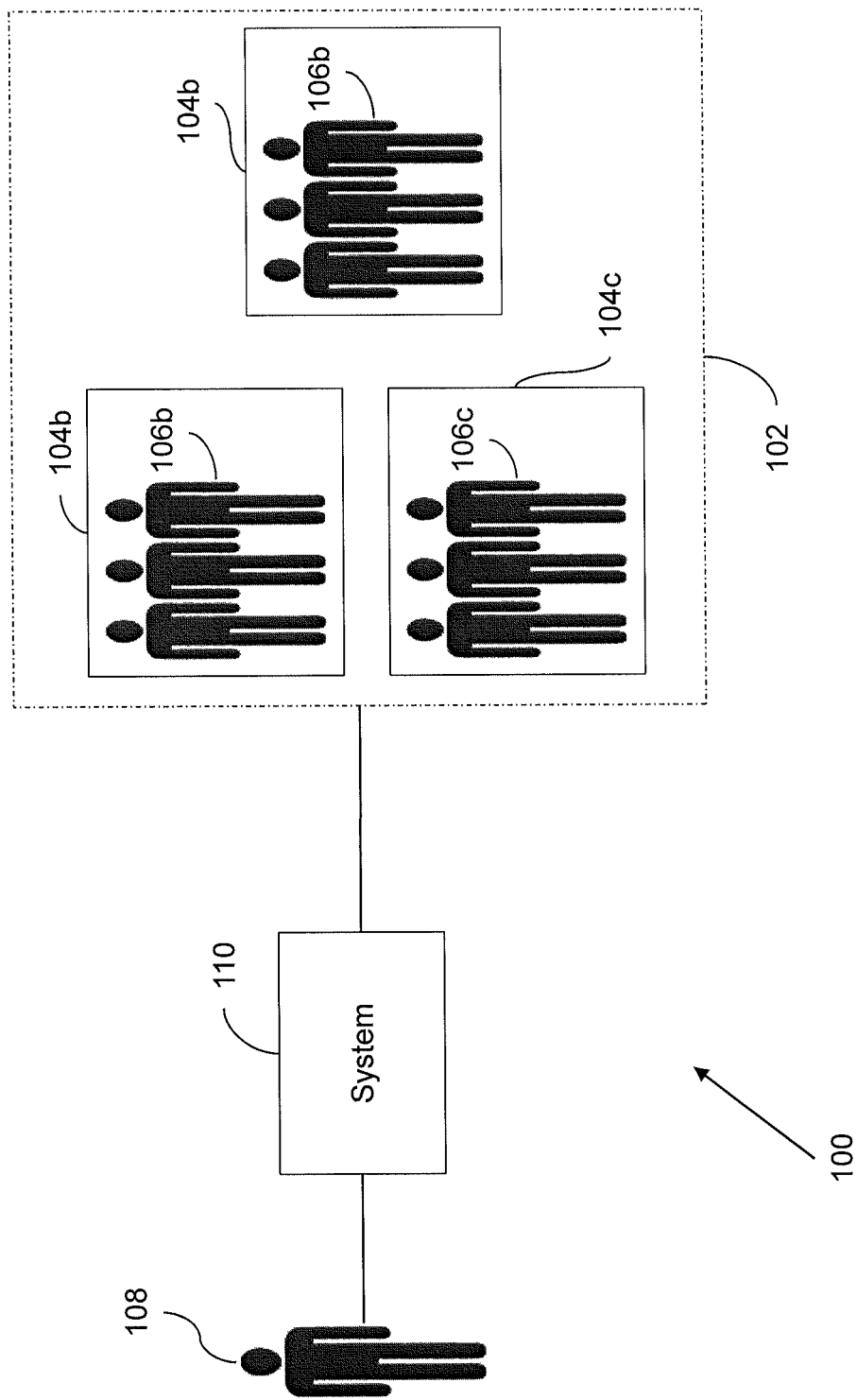
FIG. 1 is an environment in which the invention can be practiced, in accordance with various embodiments of the invention.

FIG. 1 shows an environment 100, in which various embodiments of the invention may be practiced. Environment 100 includes an organization 102, one or more groups, such as group 104a, group 104b, and group 104c (herein after collectively referred to as groups 104). Various examples of groups 104 include, but are not limited to, Line of Businesses (LOBs), Business Units (BUs), services, accounts, projects, programs, and functional groups. Further, each group includes one or more employees/users/testers/personnel such as employees 106a, 106b, and 106c, respectively. Environment 100 further includes a user 108 and a system 110. User 108 may be a consultant from a consultancy firm who helps organization 102 to understand its maturity level. In another embodiment of the invention, user 108 may be an expert from organization 102. It may be appreciated by any person skilled in the art that organization 102 may include lines of businesses that do not work in the area of testing of software applications; however, the current invention teaches the methodology for determining the maturity level of organization 102 from the testing perspective only.

Organization 102, also referred to as a testing organization, specializes/involves in the testing of software/software applications. Thus, it becomes important for the testing organization to understand its maturing level in terms of processes and procedures implemented in testing of the software applications. In an embodiment of the invention, the maturity level may be defined as a testing level of the organization with respect to the industry standard. In accordance to an embodiment of the present invention, the testing organization may be classified under five maturity levels, such as, a start-up, basic, progressive, mature, and industry leader. These levels have been explained in detail in conjunction with FIG. 2.

Further, testing of software applications is typically performed by different groups 104 of the testing organization. For example, a software application in the banking domain may be tested by group 104a, while a software application in the domain of automotives may be tested by group 104b. In other words, the team members, such as employees 106a, 106b, and 106c, of these groups 104 specialize in testing applications of a particular field for various bugs and errors.

Thus, to determine the maturity/maturity level of the testing organization, it is important that these groups individually or the testing organization as a whole are evaluated. System 110 enables user 108 to determine the maturity of the testing organization or of any of groups 104. In an embodiment of the invention, system 110 utilizes a pre-determined model to determine the maturity level of the testing organization or any of groups 104. Further, system 110 evaluates each group based on their responses to one or more questions of a questionnaire which is based on the pre-determined model. The evaluation of the responses is used by system 110 to determine the maturity level of that group. System 110 evaluates the maturity level of each group in organization 102 to determine the maturity level of organization 102. The process of determining the maturity level of a group and of organization 102 is discussed in detail with respect to FIGS. 2, 3, and 4.

Figure 2:
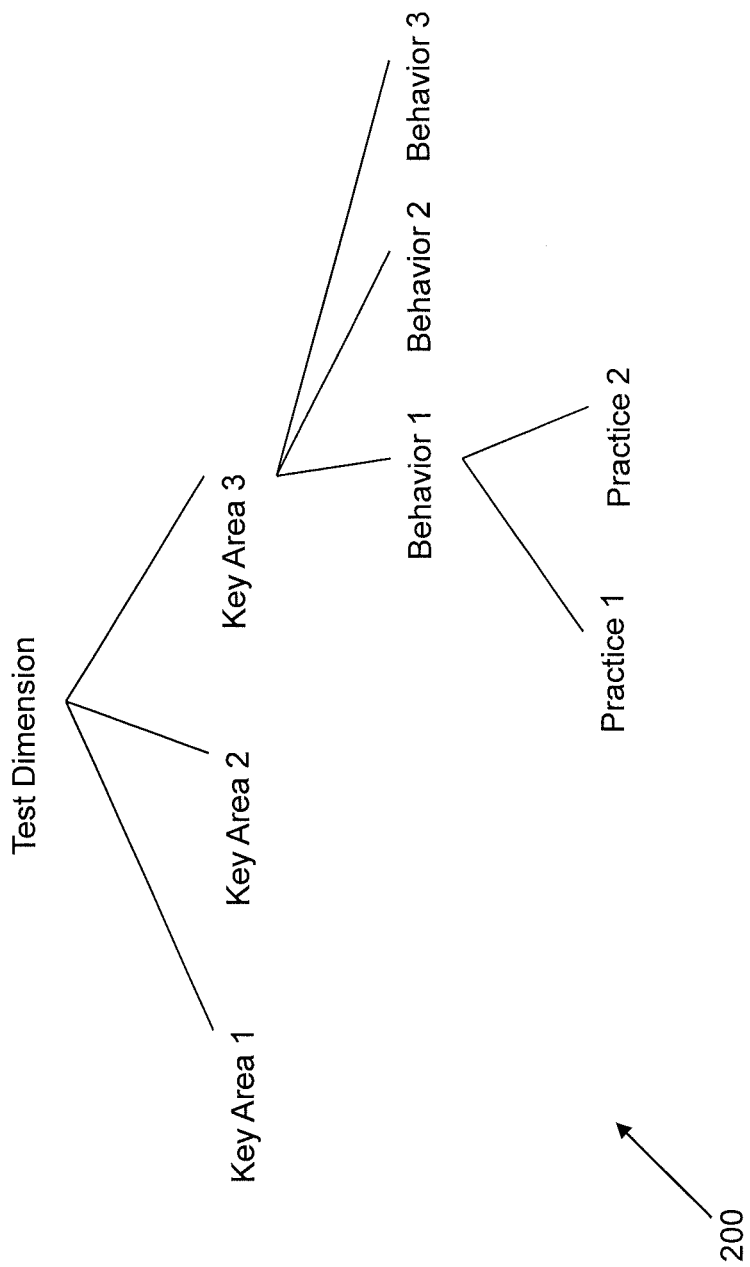
FIG. 2 illustrates the design of a pre-determined model, in accordance with an embodiment of the invention.

FIG. 2 illustrates the design/hierarchy/structure 200 of a pre-determined model, in accordance with an embodiment of the invention. Design 200 is broadly based on one or more test dimensions, one or more key areas, one or more behaviors and one or more practices.

The pre-determined model, may also be referred to as a Maturity Model (MM), is designed to assess the maturity level of a testing organization. The MM has been designed broadly to assess the maturity level of the testing organization across four test dimensions. The four test dimensions are "Test Engineering", "Test Management", "Test Governance", and "Test Competency". Further, the test dimensions are grouped based on one or more associated characteristics. In an embodiment of the invention, the "Test Engineering" and the "Test Management" test dimensions are grouped based on the project level characteristics. Similarly, "Test Competency" and "Test Governance" are grouped based on organizational-level characteristics.

In an embodiment of the invention, the maturity levels are of five types as per the pre-determined model. These are start-up (L1), basic (L2), progressive (L3), mature (L4), and industry leader (L5). Thus, each test dimension may be assessed for these five maturity levels. For example, "Test Engineering" may be L2 level, while "Test Management" may be L4 level for organization 102. Hence, the assessment of organization 102 on different dimensions also facilitates organization 102 to focus only on one dimension, such as "Test Management", to improve the maturity level of the test dimension.

For the sake of clarity, various test dimensions and the maturity levels (also may be referred to as a predefined level) are defined below.

a. The Test Dimensions:
  i. Test Management: The "Test Management" dimension focuses on the estimation, planning, monitoring, and defect management related activities of a testing project.
  ii. Test Engineering: The "Test Engineering" dimension addresses the software testing life cycle stages. Unlike considering testing as the last life cycle stage in software development, independent testing activities start with the requirements phase and continue until the application is deployed in a live environment. The pre-determined model focuses on the early involvement of testers to ensure high quality solutions are delivered.

iii. Test Governance: The "Test Governance" dimension focuses on an organization's capability to support and govern the testing projects. Test governance helps the testing organization to deploy processes and to bring in process improvements, thus benefiting the testing organization's business. It also ensures that the testing organization has a well-defined structure to manage testing projects.

iv. Test Competency: the "Test Competency" dimension addresses a testing organization's ability to develop the required test-related competencies and meet career aspiration of its employees. It gives importance to a culture of learning and skill development.

b. Maturity Levels: Various maturity levels that may be assigned to the testing organization across various test dimensions are defined in the table 2.1 below.

TABLE 2.1

| Level | Name | Description |
|---|---|---|
| L1 | Start up | a. Immature or skewed practices followed for testing<br>b. Results are unpredictable. |
| L2 | Basic | a. Key test engineering and management areas are addressed based on projects capability and knowledge.<br>b. Process aids are minimal.<br>c. Informal communication exists in the organization and no standard practices for risk management<br>d. No organizational support for test governance<br>e. Trainings are primarily driven by on the job assignments. |
| L3 | Progressive | a. Test governance is defined for the project. Test engineering and test management is driven by test governance.<br>b. Work products are formally reviewed and signed off.<br>c. Formal communication exists and risk management happens.<br>d. Trainings needs are identified and managed formally by the organization.<br>e. Knowledge management and career path is defined. |
| L4 | Mature | a. Effectiveness of dimensions is measured and benefits demonstrated.<br>b. Career progression is driven by skill and knowledge. |
| L5 | Industry Leader | a. Continuous improvement in testing process and practices.<br>b. Defect prevention is deployed and benefits demonstrated.<br>c. Innovation in testing is a focus area for the organization. |

Each test dimension includes one or more key areas, such as key area 1, key area 2, and key area 3 that affect the evaluation of each test dimension. In other words, key areas are evaluated for various maturity levels (defined above). The evaluation of key areas under a test dimension is used to evaluate the test dimension and eventually the testing organization. In an embodiment of the invention, the four dimensions span across 20 key areas. The test dimensions and the associated key areas are listed below.

Key Areas Associated with "Test Management":
1. Test Planning & Monitoring
2. Test Estimation
3. Test Ware Management
4. Test Communication
5. Organizational Risk Management
6. Defect Management Key Areas Associated with "Test Engineering":
1. Test Requirements Gathering
2. Test Strategizing
3. Test Case & Test Data Design
4. Test Tool Selection
5. Test Execution & Defect Reporting
6. Test Environment Key Areas Associated with "Test Governance":
1. Test Methodology
2. Test Process Management
3. Test Policy
4. Test Organizational Structure
5. Test Measurement & Management Key Areas Associated with "Test Competency":
1. Training & Skill Development
2. Testing Career Path
3. Knowledge Management In an embodiment of the invention, each key area (mentioned above) is evaluated for the maturity levels based on one or more behaviors, also may be referred to as behavior patterns (behavior 1, behavior 2, and behavior 3), exhibited by a tester. To further elaborate, the behavior patterns may be characteristics exhibited by the tester/testing organization for a particular maturity level. For example, the tester of the testing organization will have to formally engage in requirements phase (one of the expected behaviors) for the testing organization to qualify as a L3-level testing organization.

According to the pre-determined model, for each key area one or more behaviors are defined and are then linked with the corresponding maturity levels that help in evaluating the key area across the maturity levels. For example, the key area may have 10 behavior patterns and these behavior patterns may span across various maturity levels. This has also been illustrated in the table 2.2 below.

In the current illustration, the expected behaviors are detailed for the key area "Test Requirement Gathering" associated with the test dimension "Test Engineering". Further, each behavior is linked with a corresponding maturity level.

TABLE 2.2

| Maturity Level | Expected Behavior of Test Requirement Gathering |
|---|---|
| Basic (L2) | 1. Requirements are communicated during development phase or before testing starts.<br>2. Requirements review and validation are missing.<br>3. Requirements changes are communicated to test team. |
| Progressive (L3) | 1. Testers are formally engaged in the requirements phase.<br>2. Testability of the requirements is analyzed by the testers.<br>3. Functional and non-functional changes are formally communicated to the testing team as a part of the change management process. Inputs are provided for necessary updates to the test cases/Automation scripts/Regression test suite.<br>4. Functional and non-functional test requirements are documented and validated.<br>5. Interface requirements are captured and validated.<br>6. Traceability matrix is maintained (not design or other levels of traceability). |
| Mature (L4) | 1. Impact analysis (Impact on effort, schedule and cost) is performed for any requirements change.<br>2. Requirements stability index is measured and monitored.<br>3. Review effectiveness is measured and tracked. |
| Industry Leader (L5) | NA |

Each of these behaviors is linked with one or more practices, such as practice 1 and practice 2, followed by the testing organization. In other words, one or more practices are derived from the corresponding one or more behavior patterns. Following the above example, if the tester is formally engaged in the requirements phase, which means that the testing organization follows such practice, the testers as a part of requirements gathering engage in the requirement phase. It may be appreciated by any person skilled in the art that since the behaviors are linked to the maturity levels, the corresponding practices will also be automatically linked to the same maturity level. To further describe with an example, since the behavior "formally engaged in the requirements phase" was classified as "L3", its corresponding practice, "Engage testers in requirements phase" will be a L3 level practice. This may be also illustrated in the following table 2.3 for the behaviors described above.

TABLE 2.3

| Ref # | Test Requirement Gathering and Practices | L1 | L2 | L3 | L4 | L5 |
|---|---|---|---|---|---|---|
| TRG 2.1 | Communicate requirements to the testing team | No | Yes | | | |
| TRG 2.2 | Communicate requirement changes to the test team | No | Yes | | | |
| TRG 3.1 | Engage testers in requirements phase | No | No | Yes | | |
| TRG 3.2 | Verify testability of requirements | No | No | Yes | | |
| TRG 3.3 | Manage functional test requirements | No | No | Yes | | |
| TRG 3.4 | Manage non functional test requirements | No | No | Yes | | |
| TRG 3.5 | Identify interface requirements | No | No | Yes | | |
| TRG 3.6 | Validate requirements with relevant stakeholders (Functional, Non-functional and Interface requirements) | No | No | Yes | | |
| TRG 3.7 | Maintain requirements traceability | No | No | Yes | | |
| TRG 3.8 | Manage test requirements changes using defined change management process | No | No | Yes | Yes | |
| TRG 4.1 | Analyze the impact of requirements changes on effort/schedule/cost | No | No | No | Yes | |
| TRG 4.2 | Measure and monitor requirements stability index | No | No | No | Yes | |
| TRG 4.3 | Measure and control review effectiveness | No | No | No | Yes | |

In the above table, "Yes" in each column depicts the necessary practices to be followed to qualify for the corresponding maturity level. "Blanks" depicted in the table signify that those practices would have been followed at a low-maturity level and need to be automatically followed for a high-maturity level. For example, "Communicate requirements to the testing team" is one of the required practices to qualify as L2 level company, which means that this practice will be automatically need to be followed if the testing organization has to qualify for the higher levels L3, L4, and L5. In an embodiment of the invention, there are no practices defined for L1 maturity level. It is assumed that in an L1 maturity level, the testing organization will have skewed practices and thus will lead to unpredictable results.

Similarly, one or more behaviors and corresponding practices are defined for each key area under the four test dimensions mentioned above. It may be apparent to any person skilled in the art that the classification and identification of these behaviors are done by one or more experts. These experts by the virtue of their experience and tacit knowledge have classified these behavioral patterns under various maturity levels and, thereafter, linked to the corresponding practices.

Figure 3:
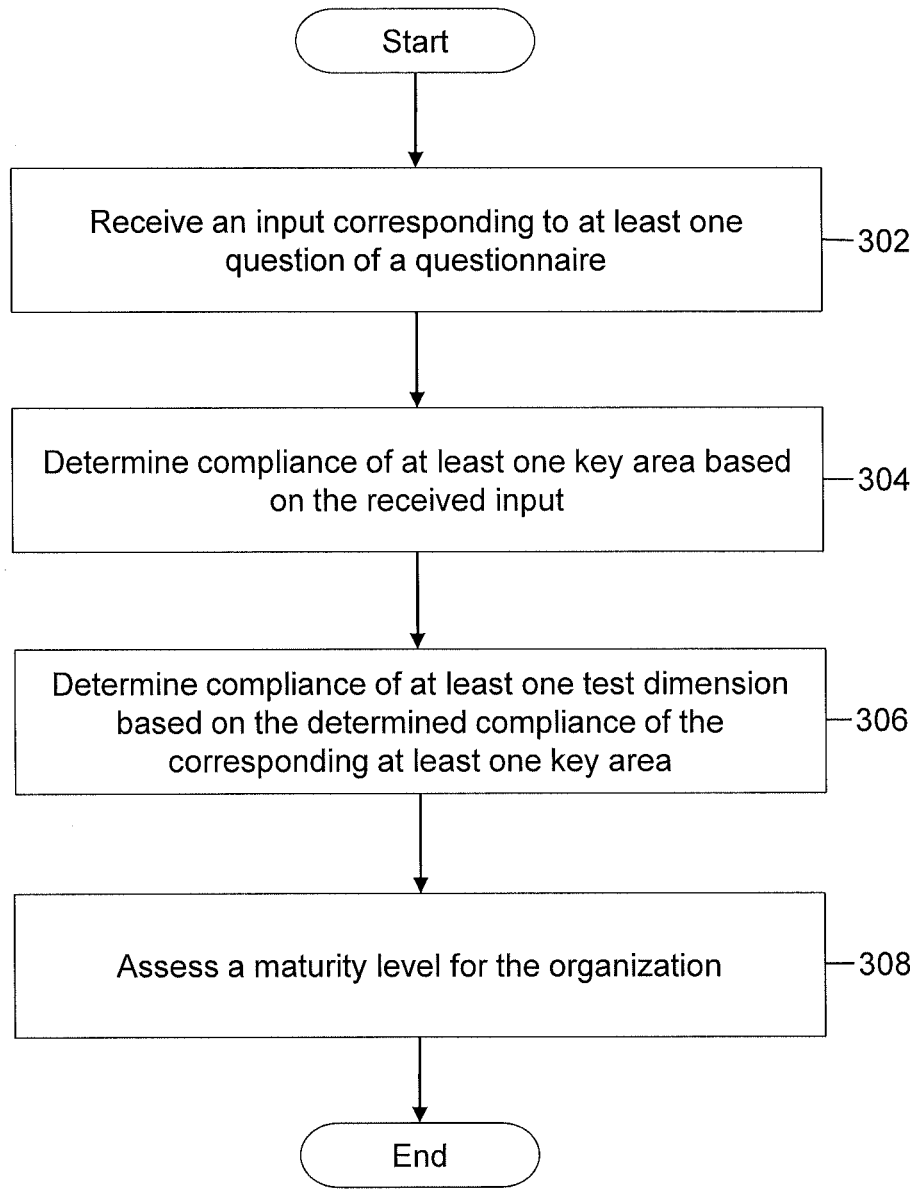
FIG. 3 is a flowchart to determine the maturity of a testing organization, in accordance with an embodiment of the invention.
Figure 4:
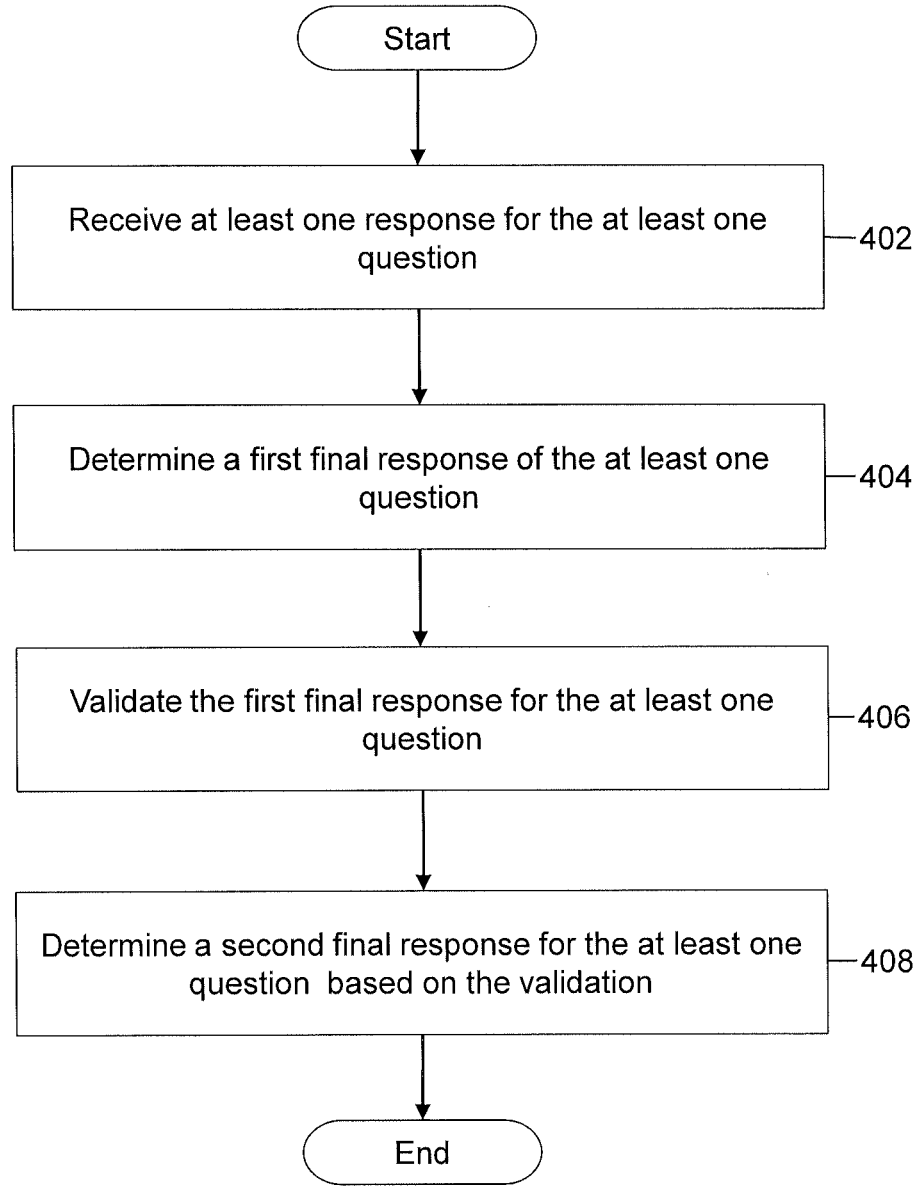
FIG. 4 is flowchart for receiving the input corresponding to a question of the questionnaire based on the pre-determined model, in accordance with the embodiment of the invention.

The methodology for determining the maturity level of the testing organization across each of the four test dimensions with the help of the pre-determined model has been explained in detail in conjunction with FIGS. 3 and 4.

FIG. 3 is a flowchart to determine maturity of the testing organization, in accordance with an embodiment of the invention. The maturity, i.e., the maturity level, of the organization is determined based on the pre-determined model. In an embodiment of the invention, a questionnaire, based on the pre-determined model, is distributed among employees of groups 104. Thereafter, the responses corresponding to each of the questions from the employees of each group are evaluated to determine the maturity level of the testing organization across the four test dimensions. For the sake of clarity, an exemplary questionnaire for a group, such as group 104a, is depicted in FIG. 3A.

At 302, an input corresponding to at least one question of a questionnaire is received. In an embodiment of the invention, each question/questions of the questionnaire is linked to a corresponding practice defined in the pre-determined model. Thus, it may be appreciated by any person skilled in the art that input corresponding to the questions (since linked with the corresponding practice) will facilitate understanding whether that practice is being followed by the testing organization. Further, since the practices are then linked to key areas and the test dimensions, the inputs thus facilitate the evaluation of the key areas and the test dimensions across various maturity levels (explained in detail below).

In an embodiment of the invention, the input is received in a pre-determined format, such as "Yes" and "No". It may be appreciated that any other suitable pre-determined format, such as numerical, characters, alphanumeric, or a combination there of may also be used to receive the input. Further, in an embodiment of the invention, the input received (also depicted in FIG. 3A) corresponding to the question is a collective representation of the responses corresponding to that question from a particular group. The collation of various responses to attain/receive the input for a particular question is explained in detail in conjunction with FIG. 4. Furthermore, for the sake of clarity and brevity, only three questions are depicted in FIG. 3A, but it may be appreciated by any person skilled in the art that the questionnaire can have various other questions.

Thereafter, at 304, the compliance of at least one key area based on the received input is determined. As explained earlier, each key area has associated practices that are spanned across various maturity levels. Further, since the questions are linked to the corresponding practices (also depicted in FIG.

3A), the compliance of the key area for each maturity level is thus determined based on the received input for the associated questions of the corresponding maturity levels. In an embodiment of the invention, the compliance of each key area for each maturity level is determined in terms of percentage. Further, an example is provided below to explain the determination of the percentage compliance of the key area for a particular maturity level.

According to FIG. 3A, there are two L2 maturity level questions for the key area "Test Requirement Gathering". Further, the received input (after collation) corresponding to the two questions is "Yes" and "Yes", respectively. Thus, in an embodiment of the invention, the percentage compliance of group 104a is 100% for the key area "Test Requirement Gathering".

To further explain with another example, there may be 16 questions for a key area, such as "Test Strategizing" spanned across four maturity levels, such as L2, L3, L4, and L5. Further, for the sake of clarity, it is assumed that each maturity level has associated four questions. Further, the received inputs for L2 maturity level questions are (Yes; Yes; Yes; and No), L3 maturity level questions (Yes; Yes; No; No), L4 maturity level questions (Yes; No; No; No) and L5 maturity level questions (Yes; No; No; No). Thus, the corresponding compliance will be, L2 (75%), L3 (50%), L4 (25%), and L5 (25%). Similarly, percentage compliance is determined for each key area, i.e., 20, across the maturity levels. Exemplary percentage compliances associated with 15 key areas across various levels is depicted in FIG. 3B. It may be noted that the for the sake of brevity, 15 key areas are depicted in FIG. 3B. In an embodiment of the invention, when there are no practices at a particular level for a particular key area, the corresponding percentage compliances are depicted as "blanks" (depicted in FIG. 3B).

It may be apparent to any person skilled in the art that in such a determination "Yes" is considered as the desired/ideal input. Further, in the current embodiment of the invention, all the questions associated with the key area are provided equal weights, hence, two (2) "Yes" in the first example lead to a 100 percent compliance. It may be apparent to any person skilled in the art that percentage compliance may vary based on the weights pre-assigned to the questions. In another embodiment of the invention, other statistical methods may also be employed to determine the compliance in absolute numbers in contrary to the percentage calculation, without deviating from the scope of the invention.

Post the determination of each key area's compliance for the maturity levels, compliance of at least one test dimension for each maturity level is determined at 306. The compliance of the test dimension is determined based on the compliance of the associated key areas. In an embodiment of the invention, one or more statistical methods may be applied based on the determined compliance for each level at the key area level to determine the test dimension's compliance for each maturity level. In another embodiment of the invention, the compliance for each level at the test dimension level is directly determined based on the associated questions. It may be apparent to any person skilled in the art that since the questions are linked to the key areas, they also automatically get linked to the test dimensions.

For the sake of clarity, determination of the test dimensions' compliance is explained with help of an exemplary embodiment. In the current example, FIG. 3C, it is assumed that one of the test dimensions, i.e., Test Dimension 1, has two key areas, such as Key Area 1 and Key Area 2. These key areas have questions that are classified under various maturity levels. Further, the received input corresponding to these questions is also depicted in the FIG. 3C. Thus, according to the current example, there are all together five (5) L2 level maturity questions and three (3) maturity level questions. Further, three (3) out of these five L2 maturity level questions have "Yes" as their received input. Thus, the percentage compliance of the Test Dimension 1 for the L2 maturity level is 60%. Similarly for L3 level, the Test Dimension 1 has 33%.

Similarly, percentage compliance is determined for each test dimension, i.e., four (4), across the maturity levels. Exemplary percentage compliances associated with the four test dimensions across various levels are depicted in FIG. 3D. In an embodiment of the invention, the compliance is determined in terms of percentages; however, there may be one or more statistical methods that may be employed to determine the compliance in absolute numbers, in contrary to the percentage calculation, without deviating from the scope of the invention.

Subsequently, at 308, the maturity level is assessed for at least one test dimension. In other words, for group 104a, the maturity level is determined for each test dimension. Following the percentage compliances depicted in FIG. 3D, maturity level (Column: Test Dimension Maturity) is determined for each test dimension. In the current example, "Test Engineering" and "Test Competency" are assigned L2 maturity level. Further, "Test Management", and "Test Governance" are assigned L3 maturity level.

In an embodiment of the invention, according to a predetermined criterion, a particular maturity level is assigned to the test dimension if the percentage compliances of the particular maturity level and a maturity level immediately below the particular maturity level, respectively, are above 85 percent. Thus, according to the current example, "Test Engineering" is L2 maturity level as the maturity level associated with the immediate next maturity level, i.e., L3, is 68 percent only. Similarly, the maturity levels of "Test Competency", "Test Management", and "Test Governance" are L2, L3, and L3, respectively. Further, in another exemplary embodiment of the invention, in case it is observed that any of the test dimensions do not qualify for the L2 maturity level based on the predefined criterion, then L1 maturity level is automatically assigned to the corresponding test dimension.

In an embodiment of the invention, a dashboard may be created for representing the percentages compliance of the key areas and the test dimension in a pre-defined format. For example, "Up to 50 percent compliance" may be represented in "Red Color". Similarly, "50-85 percent compliance" and "Above 85 percent compliance" may be represented in "Yellow Color" and in "Green Color", respectively. However, any other suitable predefined format may also be used to depict the compliance level of the test dimensions and the key areas.

It may be apparent to any person skilled in the art that in case the testing organization has only one group, i.e., group 104a, which actively involves in testing, then the maturity levels for group 104a across the four dimensions will be same as that for the testing organization. However, in case the organization has multiple groups, such as group 104a, group 104b, group 104c, and group 104d (not shown in the figures), then the maturity level across the four dimensions is determined for each group (as described in 302-308). Thereafter, the maturity level across the four dimensions for the testing organization is determined based on the determined maturity levels across the four dimensions for each group. This is further elaborated with help of an example. As depicted in FIG. 3E, the maturity levels for each group across the four dimensions are determined. Thereafter, in an embodiment of the invention, the lowest maturity level corresponding to the test dimension is considered as the maturity level/overall maturity level of the testing organization for that maturity level. Following FIG. 3E, the test dimension, "Test Engineering" has maturity levels as L3, L3, L4, and L2 corresponding to groups 104*a*, 104*b*, 104*c*, and 104*d*. Hence, the maturity level for the testing organization is L2 (lowest) for the "Test Engineering". Similarly, the maturity level for each test dimension is determined.

FIG. 4 is a flowchart for receiving the input corresponding to a question of the questionnaire, in accordance with the embodiment of the invention.

As explained earlier, the questionnaire (as depicted in FIG. 3A) is distributed among employees of groups 104. For the sake of clarity and brevity, similar to FIG. 3, the method steps will be explained for a single group, such as group 104*a*. Further, in an exemplary embodiment of the invention, it is assumed that group 104*a* consists of six employees, may be referred to as employees 106*a*.

At 402, response for each question is received from employees 106*a* of group 104*a*. Thus, for a particular question, the responses may be "Yes", "Yes", "No", "Yes", "No", and "Yes".

Thereafter at 404, a first final response for each question is determined based on the corresponding received responses. In an embodiment of the invention, the first final response is determined based on the statistical mode of the received responses. Following the above example, the determined first final response is "Yes". In an exemplary embodiment of the invention, in case there are equal number of "Yes" and "No", then "Yes" may considered as the first final response, which will be later validated at 406. In another embodiment of the invention, any other statistical/mathematical model may be employed to determine the first final response from the received responses.

Subsequently, the first final response is validated at 406. In an embodiment of the invention, each first final response corresponding to the question is validated by the experts. For example, employees 106 may be interviewed to cross check the first final response. Further, one or more artifacts may be reviewed by the experts to make sure that the responses that are provided are valid.

At 408, a second final response based on the validation is determined. In an embodiment of the invention, if the interviews and the artifact reviews are in tandem with the first final response, then the first final response is considered as the final response, i.e., the second final response, for the question. However, in case it is found to be otherwise during the interviews and artifact reviews then the first final response is changed to the second final response. For example, the first final response for a question, such as "Is there a master test strategy for common types of testing that is maintained on a periodic basis" may be "Yes"; however, during the artifacts reviews it was concluded that this practice was not followed, therefore the second final response will be changed to "No".

Thus, the second final response is considered as the final response, i.e., the input (as received in 302) for determining the maturity level of the testing organization across the four test dimensions. It may be apparent to any person skilled in the art that 402-408 may be repeated for each group of groups 104 to determine the input corresponding to the questions of the questionnaire.

In an embodiment of the invention, the questionnaire may be distributed to employees 106 by means of electronic communication, such as online forms. In another embodiment of the invention, the questionnaire may be circulated as physical copies in groups 104.

Figure 5:
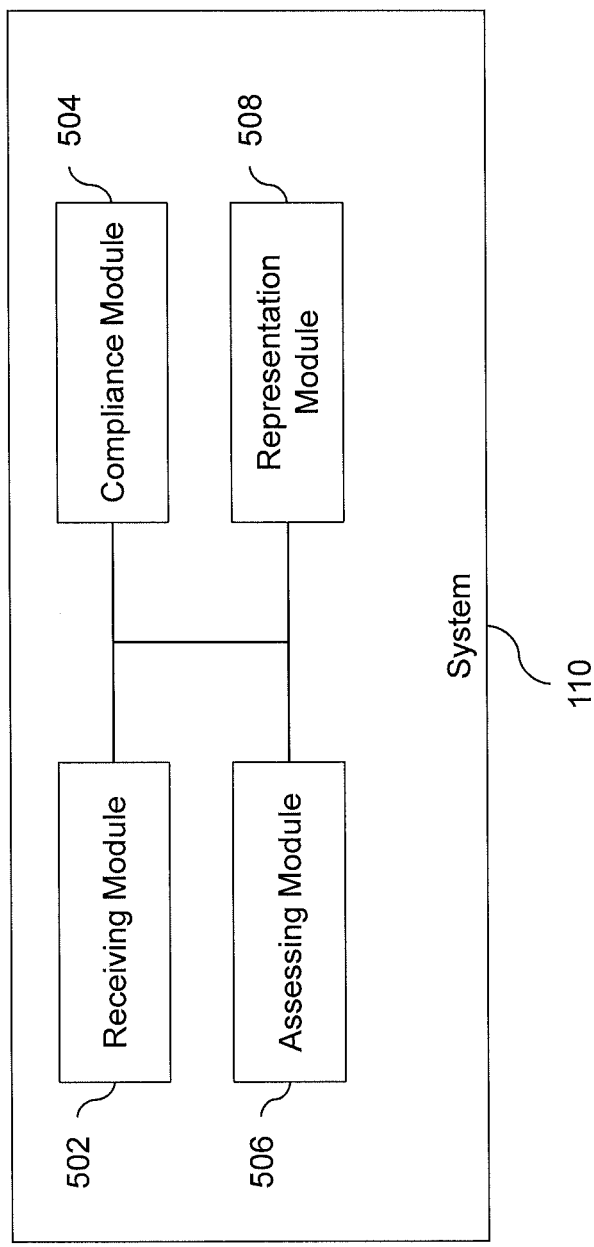
FIG. 5 is a block diagram of a system for determining the maturity of a testing organization, in accordance with an embodiment of the invention.

FIG. 5 is a block diagram of system 110 to determine the maturity of a testing organization, in accordance with an embodiment of the invention. System 110 includes a receiving module 502, a compliance module 504, an assessing module 506, and a representation module 508.

As explained earlier, a questionnaire based on a pre-determined model is distributed among groups 104. The pre-determined model is designed based on one or more test dimensions, one or more key areas, one or more behaviors and one or more practices.

Receiving module 502 receives an input corresponding to each question of the questionnaire. In an embodiment of the invention, receiving module 502 receives individual responses to the questions from each employee of each group. Subsequently, receiving module 502 determines a first final response corresponding to each question for each group. Further, collation of the individual response to determine the first final response and a second final response, i.e., the input, is explained in detail in conjunction with FIG. 4.

Post receiving the input corresponding to each question of the questionnaire, compliance module 504 determines the compliance each of the associated key areas and test dimensions. Further, determination of the compliance of the key areas and the test dimensions is explained in detail in conjunction with FIG. 3. Subsequently, assessing module 506 assesses/determines the maturity level of the testing organization for each of the four test dimensions. Further, assessment of the maturity level for each dimension of the testing organization is explained in detail in conjunction with FIG. 3.

In another embodiment of the invention, representation module 508 represents/presents the percentage compliances across different maturity levels for each of the key areas and the test dimensions in a pre-defined format. Representation module 508 may present the percentage compliances in the form of a dashboard. Further, presentation of the percentage compliances has been explained in detail in conjunction with FIG. 3.

In various embodiments of the invention receiving module 502, compliance module 504, assessing module 506, and representation module 508 can be implemented in the form of hardware, software, firmware, and/or combinations thereof. Further, in an embodiment of the invention, system 110 is implemented in an MS-Excel®. Further, in various embodiments of the invention, system 110 utilizes the computational capabilities of a microprocessor of a computing device (not shown in the figures) to determine the maturity level of the testing organization across the four test dimensions.

The method, system, and computer program product described above have a number of advantages. Firstly, the determination of the maturity level of the testing organization is based on the robust pre-determined model. The pre-determined model facilitates assessing the maturity level of the testing organization across various test dimensions. Furthermore, in addition to determining the maturity level across the test dimensions, the pre-determined model facilitates the assessment of various key areas associated with the test dimensions. Such an assessment of the testing organization across these four dimensions and the associated key areas will facilitate the testing organization to understand its current testing procedures and its improvement areas in a more detailed fashion. Further, it may also help the testing organization to focus its time and resources in one particular direction, such as "Test Management".

Moreover, the pre-determined model is primarily based on the behaviors associated with each of the key area that are further translated to multiple practices. Thus, these practices help the testing organization to understand its current procedures and the procedures that the testing organization should employ to attain significant maturity levels. Further, since the list of practices associated with each key area is an exhaustive compilation, it benefits in better assessment of the testing organization and thereby guiding the testing organization by providing granular level details. In addition to the above advantages, the assessment of the testing organization is performed based on a standard questionnaire, which is based on the pre-determined model. Further, the responses provided by the employees of the testing organizations are also validated to ensure data authenticity. Such an assessment at each level based on the responses of the testers provides a robust and foolproof mechanism to determine the maturity level of the testing organization.

The system to determine the maturity of a testing organization, as described in the present invention or any of its components, may be embodied in the form of a computer system. Typical examples of a computer system include a general-purpose computer, a programmed microprocessor, a micro-controller, a peripheral integrated circuit element, and other devices or arrangements of devices that are capable of implementing the steps that constitute the method for the present invention.

The computer system comprises a computer, an input device, a display unit, and the Internet. The computer further comprises a microprocessor, which is connected to a communication bus. The computer also includes a memory, which may include Random Access Memory (RAM) and Read Only Memory (ROM). The computer system also comprises a storage device, which can be a hard disk drive or a removable storage drive such as a floppy disk drive and an optical disk drive. The storage device can also be other similar means for loading computer programs or other instructions into the computer system. The computer system also includes a communication unit, which enables the computer to connect to other databases and the Internet through an Input/Output (I/O) interface. The communication unit also enables the transfer as well as reception of data from other databases. The communication unit may include a modem, an Ethernet card, or any similar device, which enable the computer system to connect to databases and networks such as Local Area Network (LAN), Metropolitan Area Network (MAN), Wide Area Network (WAN), and the Internet. The computer system facilitates inputs from a user through an input device, accessible to the system through an I/O interface.

The computer system executes a set of instructions that are stored in one or more storage elements, to process the input data. The storage elements may also hold data or other information as desired. The storage element may be in the form of an information source or a physical memory element present in the processing machine.

The present invention may also be embodied in a computer program product for determining maturity of a testing organization. The computer program product includes a computer usable medium having a set program instructions comprising a program code for determining maturity of a testing organization. The set of instructions may include various commands that instruct the processing machine to perform specific tasks such as the steps that constitute the method of the present invention. The set of instructions may be in the form of a software program. Further, the software may be in the form of a collection of separate programs, a program module with a large program or a portion of a program module, as in the present invention. The software may also include modular programming in the form of object-oriented programming. The processing of input data by the processing machine may be in response to user commands, results of previous processing or a request made by another processing machine.

While the preferred embodiments of the invention have been illustrated and described, it will be clear that the invention is not limited to these embodiments only. Numerous modifications, changes, variations, substitutions, and equivalents will be apparent to those skilled in the art without departing from the spirit and scope of the invention, as described in the claims.

The invention claimed is:

1. A method of determining maturity of an organization, the organization being involved in testing of software, the method comprising:
 a. receiving an input by a processor corresponding to at least one question of a questionnaire, the questionnaire being designed based on a pre-determined model, the pre-determined model comprising one or more test dimensions, each of the one or more test dimensions comprising one or more key areas, each of the one or more key areas having one or more behaviors, each of the one or more behaviors having one or more practices, each of the one or more practices being assigned a pre-defined level, wherein each question of the questionnaire is associated with a corresponding practice;
 b. determining compliance of at least one key area by a processor, based on the input received corresponding to one or more questions corresponding to the at least one key area;
 c. determining compliance of at least one test dimension by a processor, based on the determined compliance of the corresponding at least one key area; and
 d. assessing a maturity level for the organization by a processor, across the at least one test dimension based on the determined compliance of the at least one test dimension.

2. The method according to claim 1, wherein the one or more behaviors is pre-defined by one or more experts.

3. The method according to claim 1, wherein receiving the input comprises:
 a. receiving at least one response for the at least one question from one or more personnel belonging to one or more groups in the organization;
 b. determining a first final response of the at least one question for at least one of the one or more groups based on the received at least one response;
 c. validating the first final response for the at least one question; and
 d. determining a second final response for the at least one question for the at least one of the one or more groups based on the validation, wherein the second final response is the input received corresponding to the at least one question.

4. The method according to claim 3, wherein the at least one response is received in a pre-determined format.

5. The method according to claim 3, wherein determining the first final response comprises identifying a statistical mode of the received at least one response.

6. The method according to claim 3, wherein validating the first final response comprises validating the first final response by conducting interviews and artifact review.

7. The method according to claim 1, wherein the at least one test dimension is grouped with at least one other test dimension based on one or more associated characteristics, the at least one test dimension and the at least one other test dimension being associated with the one or more test dimensions.

8. The method according to claim 1, wherein determining the compliance of the at least one key area comprises assessing the compliance of the at least one key area for at least one pre-defined level.

9. The method according to claim 1, wherein determining the compliance of the at least one test dimension comprises assessing the compliance of each test dimension for at least one pre-defined level.

10. The method according to claim 1, wherein assessing the maturity level for the organization across the at least one test dimension comprises assessing a maturity level for one or more groups in the organization across the at least one test dimension, the maturity level for at least one of the one or more groups being assessed based on the determined compliance of the at least one test dimension and a pre-determined criterion.

11. The method according to claim 10, wherein the one or more groups comprise at least one of Line of Businesses (LOBS), Business Units (Bus), services, accounts, projects, programs, and functional groups.

12. The method according to claim 1 further comprising representing the compliance of the at least one key area and the compliance of the at least one test dimension in a pre-defined format.

13. A system for determining maturity of an organization, the organization being involved in testing of a software, the system comprising:
a processor including:
   a. a receiving module configured for receiving an input corresponding to at least one question of a questionnaire, the questionnaire being designed based on a pre-determined model, the pre-determined model comprising one or more test dimensions, each of the one or more test dimensions comprising one or more key areas, each of the one or more key areas having one or more behaviors, each of the one or more behaviors having one or more practices, each of the one or more practices being assigned a pre-defined level, wherein each question of the questionnaire is associated with a corresponding practice;
   b. a compliance module configured for:
      i. determining compliance of at least one key area based on the input received corresponding to one or more questions corresponding to the at least one key area;
      ii. determining compliance of at least one test dimension based on the determined compliance of the corresponding at least one key area; and
   c. an assessing module configured for assessing a maturity level for the organization across the at least one test dimension based on the determined compliance of the at least one test dimension.

14. The system according to claim 13, wherein the receiving module is further configured for:
a. receiving at least one response for the at least one question from one or more personnel belonging to one or more groups in the organization; and
b. determining a first final response of the at least one question for at least one of the one or more groups based on the received at least one response, wherein the first final response facilitates determination of the second final response for the at least one of the one or more groups, the second final response being the input received corresponding to the at least one question.

15. The system according to claim 14, wherein the receiving module is configured for receiving the at least one response in a pre-determined format.

16. The system according to claim 14 wherein the receiving module is further configured for determining the first final response by identifying a statistical mode of the received at least one response.

17. The system according to claim 13, wherein the compliance module is configured for determining the compliance of the at least one key area by assessing the compliance of the at least one key area for at least one pre-defined level.

18. The system according to claim 13, wherein the compliance module is configured for determining the compliance of the at least one test dimension by assessing the compliance of each test dimension for at least one pre-defined level.

19. The system according to claim 13, wherein the assessing module assesses the maturity level for the organization across the at least one test dimension by assessing a maturity level for one or more groups in the organization across the at least one test dimension, the maturity level for at least one of the one or more groups being assessed based on the determined compliance of the at least one test dimension and a pre-determined criterion.

20. The system according to claim 13 further comprising a representation module configured for representing the compliance of the at least one key area and the compliance of the at least one test dimension in a pre-defined format.

21. A non-transitory computer readable medium for determining maturity of an organization, the organization being involved in testing of software, said medium comprising a non-transitory computer program code for:
a. receiving an input corresponding to at least one question of a questionnaire, the questionnaire being designed based on a pre-determined model, the pre-determined model comprising one or more test dimensions, each of the one or more test dimensions comprising one or more key areas, each of the one or more key areas having one or more behaviors, each of the one or more behaviors having one or more practices, each of the one or more practices being assigned a pre-defined level, wherein each question of the questionnaire is associated with a corresponding practice;
b. determining compliance of at least one key area based on the input received corresponding to one or more questions corresponding to the at least one key area;
c. determining compliance of at least one test dimension based on the determined compliance of the corresponding at least one key area; and
d. assessing a maturity level for the organization across the at least one test dimension based on the determined compliance of the at least one test dimension.

22. The non-transitory computer readable medium according to claim 21, wherein receiving the input comprises:
a. receiving at least one response for the at least one question from one or more personnel belonging to one or more groups in the organization;
b. determining a first final response of the at least one question for at least one of the one or more groups based on the received at least one response;
c. validating the first final response for the at least one question; and
d. determining a second final response for the at least one question for the at least one of the one or more groups based on the validation, wherein the second final response is the input received corresponding to the at least one question.

23. The non-transitory computer readable medium according to claim 22, wherein the at least one response is received in a pre-determined format.

24. The non-transitory computer readable medium according to claim 22, wherein determining the first final response comprises identifying a statistical mode of the received at least one response.

25. The non-transitory computer readable medium according to claim 21, wherein determining the compliance of the at least one key area comprises assessing the compliance of the at least one key area for at least one pre-defined level.

26. The non-transitory computer readable medium according to claim 21 further comprising assessing the maturity level for the organization across the at least one test dimension by assessing a maturity level for one or more groups in the organization across the at least one test dimension, the maturity level for at least one of the one or more groups being assessed based on the determined compliance of the at least one test dimension and a pre-determined criterion.

27. The non-transitory computer readable medium according to claim 21 further comprising representing the compliance of the at least one key area and the compliance of the at least one test dimension in a pre-defined format.

* * * * *